US007288298B2

(12) United States Patent
Huang

(10) Patent No.: US 7,288,298 B2
(45) Date of Patent: Oct. 30, 2007

(54) CONFIGURATION OF FIGURAL ORNAMENT

(76) Inventor: Sheng-Wen Huang, Peter Hancraft Factory, Xin Fa Industry Area, Xin Qiao Village, ShaJing, Bao'an, Shenzhen (CN) 518125

( * ) Notice: Subject to any disclaimer, the term of this patent is extended or adjusted under 35 U.S.C. 154(b) by 378 days.

(21) Appl. No.: 10/514,155

(22) PCT Filed: Sep. 29, 2003

(86) PCT No.: PCT/CN03/00835

§ 371 (c)(1),
(2), (4) Date: Nov. 4, 2004

(87) PCT Pub. No.: WO2005/025708

PCT Pub. Date: Mar. 24, 2005

(65) Prior Publication Data

US 2006/0057308 A1 Mar. 16, 2006

(30) Foreign Application Priority Data

Sep. 17, 2003 (CN) ................................ 03 2 38205

(51) Int. Cl.

| | |
|---|---|
| *A47G 33/04* | (2006.01) |
| *A47G 7/00* | (2006.01) |
| *G09F 17/00* | (2006.01) |
| *G09F 19/00* | (2006.01) |
| *A01N 3/00* | (2006.01) |
| *A41G 1/00* | (2006.01) |
| *A47B 43/00* | (2006.01) |
| *A47B 47/00* | (2006.01) |
| *A47B 57/00* | (2006.01) |
| *A47F 5/00* | (2006.01) |
| *F21S 6/00* | (2006.01) |

(52) U.S. Cl. ................. 428/9; 428/8; 428/18; 211/197; 211/196; 211/86.01; D11/121; 362/123; 248/27.8

(58) Field of Classification Search .................. 40/442, 40/538, 610, 540; 428/18, 20, 15; D11/118; 211/197, 196, 86.01; 403/150, 151

See application file for complete search history.

(56) References Cited

U.S. PATENT DOCUMENTS

| | | | | |
|---|---|---|---|---|
| 3,677,867 | A * | 7/1972 | Westlund | 428/9 |
| 5,336,536 | A * | 8/1994 | Oberzan | 428/8 |
| 5,458,249 | A * | 10/1995 | Shang-Lu | 211/197 |
| D371,087 | S * | 6/1996 | Jacobson | D11/121 |

* cited by examiner

*Primary Examiner*—Lesley D. Morris
*Assistant Examiner*—Syed A Islam
(74) *Attorney, Agent, or Firm*—Andrus, Sceales, Starke & Sawall, LLP

(57) ABSTRACT

A human-shaped adornment includes a supporting holder, which comprising a base and a supporting component; and a spiraled frame having a same axis with the supporting component. The spiraled frame includes a plurality of rings, which outline along its axis direction is a curve which is constituted by three arcs smoothly connecting with each other in a predetermined sequence; wherein the center of the three arcs are on a same line and their diameters gradually increase from top to bottom; the spiraled frame connecting with the supporting component through a connector having a plurality of connecting strings connected therewith for keeping the space between every two rings of the spiraled frame; wherein the connecting strings sequentially connects with each ring of the spiraled frame from top to bottom.

4 Claims, 5 Drawing Sheets

CONFIGURATION OF FIGURAL ORNAMENT

CROSS REFERENCE TO RELATED APPLICATIONS

The present application claims priority from PCT Application No. PCT/CN03/00835, filed on Sep. 29, 2003, which claims the benefit of Chinese Application Serial No. 03238205.7, filed on Sep. 17, 2003.

FIELD OF THE INVENTION

The present invention relates to a kind of adornment, and more particularly to a kind of human-shaped adornment.

BACKGROUND OF THE INVENTION

All kinds of adornments, including some human-shaped adornments are widely used in festivals. However, as some human-shaped adornments, they are not convenient to be transported and deposited for their huge size.

SUMMARY OF THE INVENTION

To overcome the above-mentioned drawbacks, the object of the invention is to provide a human-shaped adornment which can be furled and has a simple, novelty structure.

A human-shaped adornment comprises a supporting holder, which comprising a base and a supporting component; and a spiraled frame having a same axis with the supporting component. The spiraled frame comprises a plurality of rings, which outline along its axis direction is a curve which is constituted by three arcs smoothly connecting with each other in a predetermined sequence; wherein the center of the three arcs are on a same line and their diameters gradually increase from top to bottom; the spiraled frame connecting with the supporting component through a connector having a plurality of connecting strings connected therewith for keeping the the space between every two rings of the spiraled frame; wherein the connecting strings sequentially connects with each ring of the spiraled frame from top to bottom.

The supporting component further comprises another several connectors in predetermined positions thereof, and each of the connectors is connected with the ring of the spiraled frame on a position corresponding to the position thereof. Each of the connectors comprises a pothook having a through hole in an end and a hook in the other end, and a cross-shaped component coupled to the supporting component; the cross-shaped component comprising a plurality of slot-shaped extensions extending radially; each of the slot-shaped extensions having a through hole formed therein; a peg extending through both the through holes in the slot-shaped extension and the pothook; the hook of the pothook coupled to the ring of the spiraled frame.

The spiraled frame is made from metal wire which is twisted by two groups of metal silks. A PVC thin bar is sandwiched between the two groups of metal silks. The spiraled frame is enlaced with cluster lamps.

Comparing with the prior art, the present invention has the following beneficial effects:

(1) Using the knowledge of the furled spiral, the spiraled frame can be taken down and furled when transporting and depositing, so as to reduce the volume of the human-shaped adornment;

(2) the invention can be used widely, not only for large human-shaped adornment, but for small size one.

(3) the human-shaped adornment of the invention has a simple structure and a low manufacturing cost.

For the purpose of making the invention easier to understand, several particular embodiments thereof will now be described with reference to the appended drawings in which:

DETAILED DESCRIPTION

Figure 1:
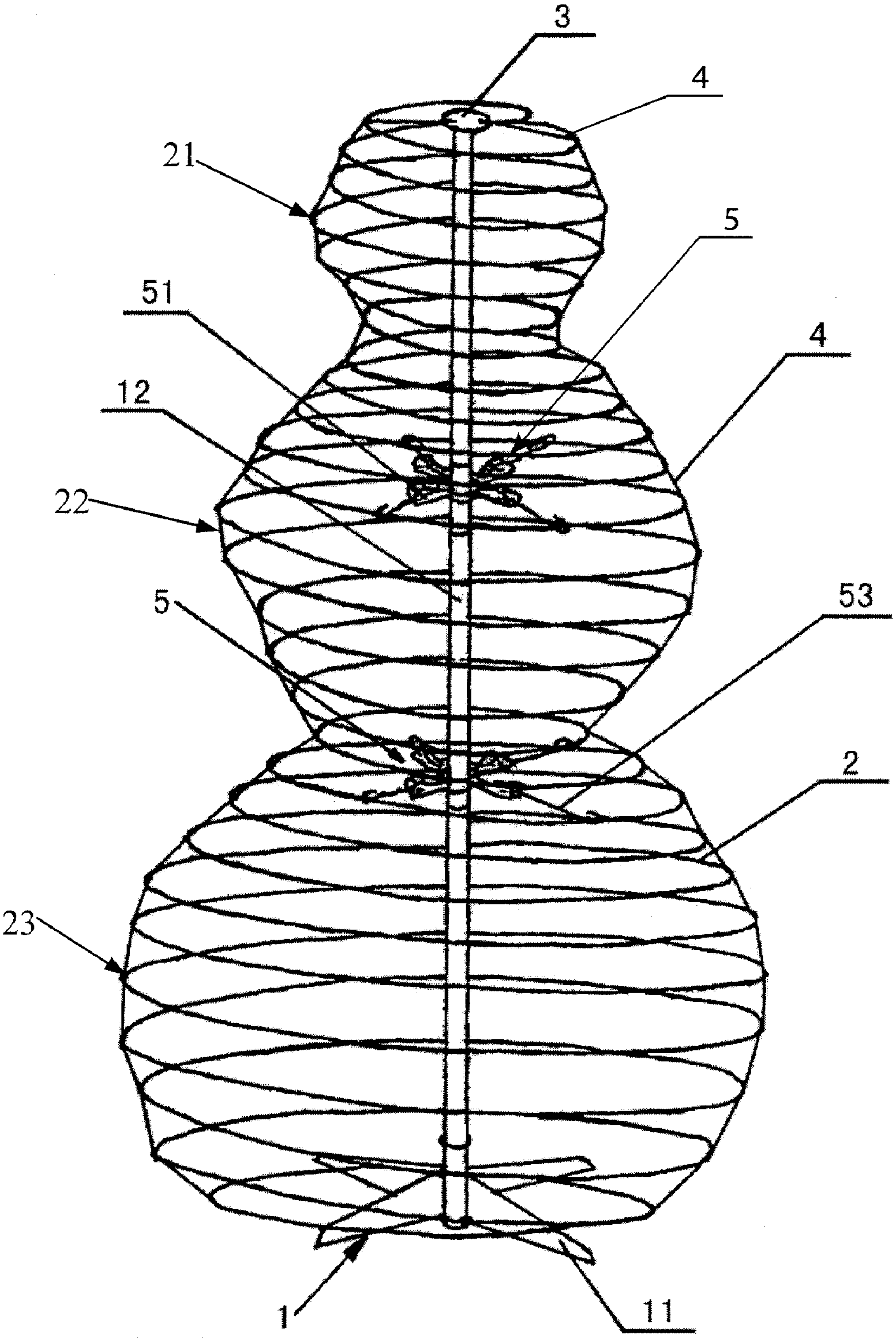
FIG. 1 is a structural sketch drawing of a human-shaped adornment according to a first embodiment of this invention.

Referring to FIG. 1, a human-shaped adornment of the present invention comprises a supporting holder 1 and a spiraled frame 2. The supporting holder 1 comprises a base 11 and a supporting component 12. The supporting component 12 can be engaged with the base 11 when it is used, and can be taken out of the base 11 when it is unused. The supporting component 12 can be formed by assembling several supporting poles, or only constituted by a single supporting pole. A plurality of rolling wheels (not depicted) can be mounted on the bottom of the base 11 in order to freely move the human-shaped adornment. The spiraled frame 2 has a same axis with the supporting component 12. The spiraled frame 2 has a curve-shaped outline along its axis direction which is constituted by three arcs (21, 22, 23) smoothly connecting each other in a predetermined sequence. The centers of the three arcs (21, 22, 23) are on a same line and their diameters gradually increase from the top arc 21 to the bottom arc 23. The three arcs (21, 22, 23) are all obtuse angle arcs.

Referring to FIG. 1, according to a first embodiment of the invention, a top connector 3 is mounted on top of the supporting component 12 by a center hole therein, which can be taken away therefrom when necessary. The top connector 3 is disk-shaped. The top of the spiraled frame 2 is welded to the top connector 3. In order to prevent the spiral frame 2 from extending distortion due to the effect of gravity, it is necessary to use the connecting strings 4 to connect the rings of the spiraled frame 2 in sequence order to keep the distance between every two rings. The connecting strings 4 connect with the top connector 3 by through holes formed in the top of the top connector 3. The amount of the connecting strings 4 is determined according to the size and weight of the spiraled frame 2. In a preferred embodiment, the amount of the connecting strings is eight; however in FIG. 2 only two strings are depicted for simplification of the drawing.

Figure 3:
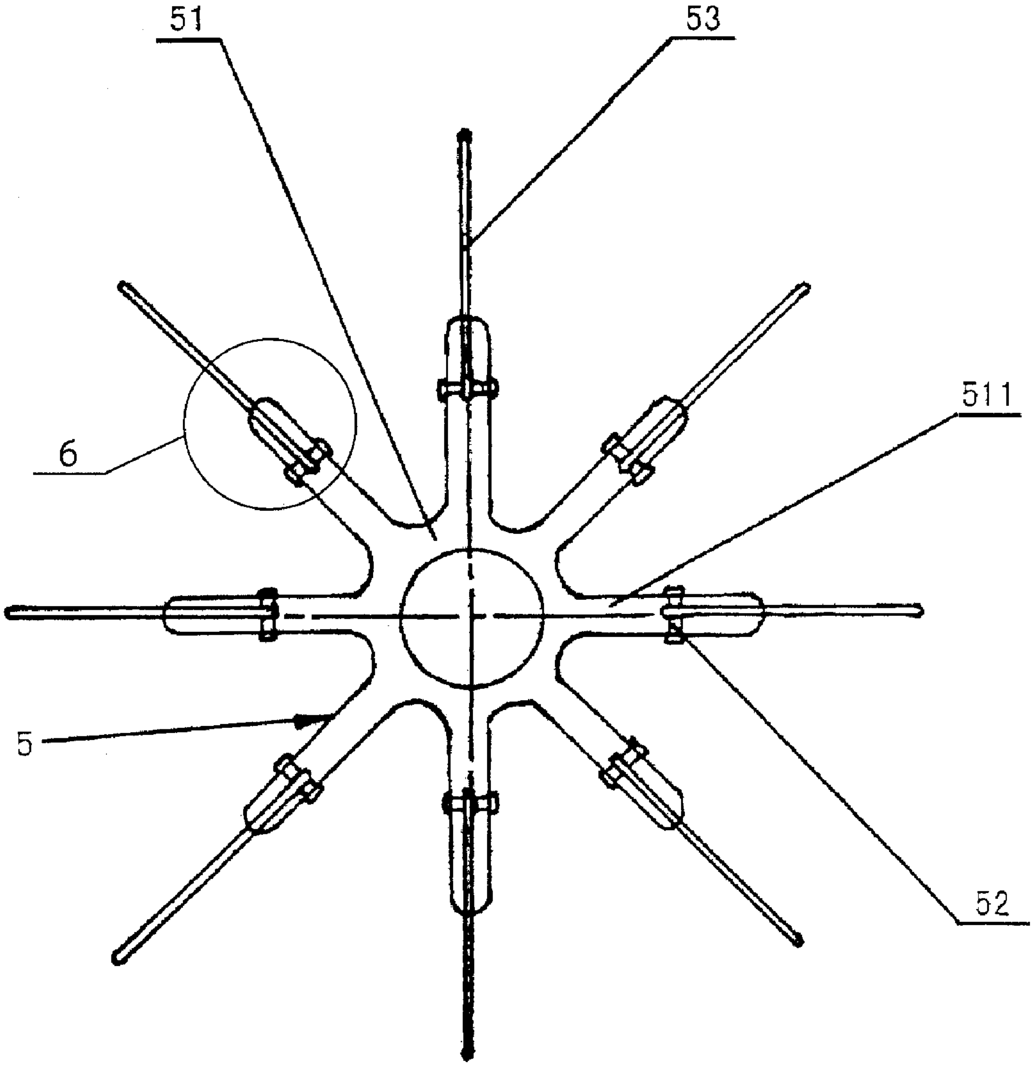
FIG. 3 is a structural sketch drawing of a connector of the human-shaped adornment of FIG. 1.
Figure 4:
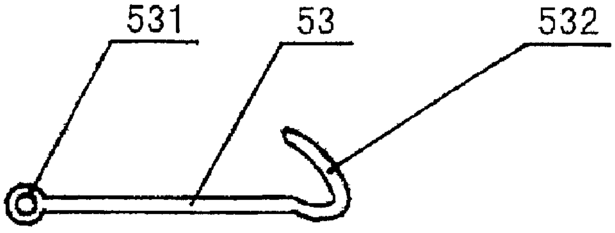
FIG. 4 is a structural sketch drawing of a pothook of the human-shaped adornment of FIG. 1.
Figure 6:
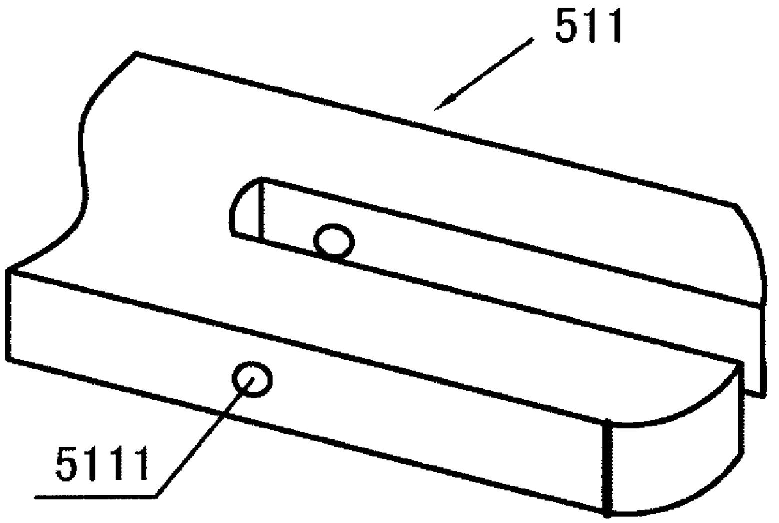
FIG. 6 is an enlarged view of a slot-shaped extension of FIG. 3.

In addition, there are two additional intermediate connectors 5 fixed on predetermined positions of the supporting component 12, as shown in FIG. 3. Each of the intermediate connectors 5 comprises a cross-shaped component 51 and a pothook 53 (depicted in FIG. 4) having a through hole 531 in an end and a hook 532 in the other end. The cross-shaped component 51 is a punched component with a central hole, by which the intermediate connector 5 is coupled to the supporting component 12. The cross-shaped component 51 also has a plurality of such as eight, slot-shaped extensions 511 extending radially. FIG. 6 depicts a close-up view of a slot shaped extension 511 as denoted by reference numeral 6 of FIG. 3. Each of the slot-shaped extensions 511 has a through hole 5111 formed therein; a peg 52 extends through both the through holes 5111 in the slot-shaped extension 511 and the pothook 53. The hook 532 of the pothook 53 may then be coupled to the ring of the spiraled frame 2 to secure the spiraled frame, a detailed structure of the pothook 53 is shown in FIG. 4.

Figure 2:
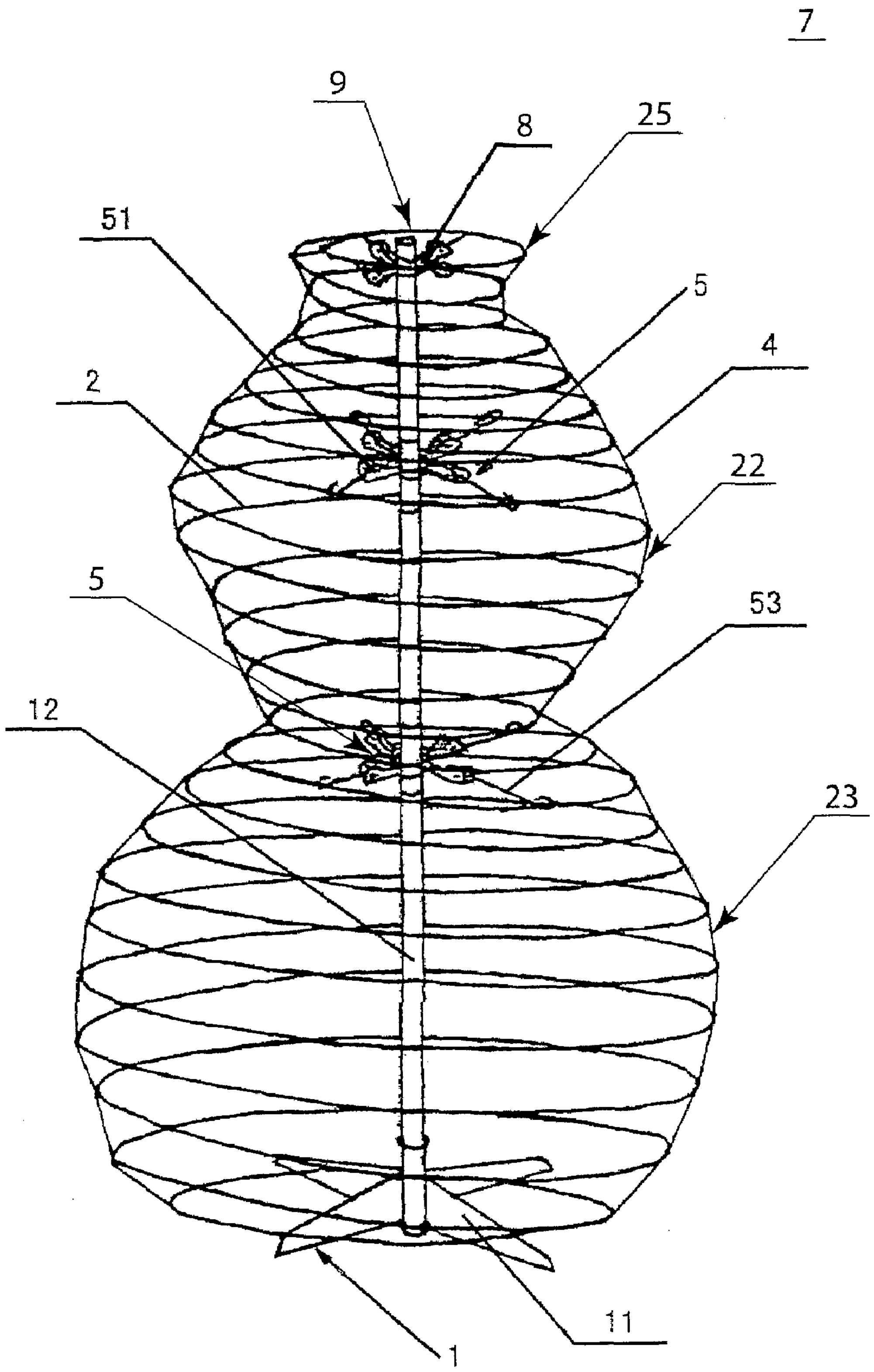
FIG. 2 is a structural sketch drawing of a human-shaped adornment according to another embodiment of this invention.

FIG. 2 is a structural sketch drawing of a second embodiment of the human-shaped adornment 7, which has a similar structure with the first embodiment of the invention. The differences between the two embodiments are as follows: firstly, the first arc 25 of the outline of the spiraled frame 2 along its axis direction is an acute angle arc, and the other two arcs (22, 23) of the spiraled frame 2 are obtuse angle arcs. The human-shaped adornment 7 is suitable to use with a separately made head structure (not depicted) placed on the top of the human-shaped adornment 7. Under this circumstance, it is unnecessary to make a top spiral consisting of the rings. However, in order to enable the separately made head to fit the spiraled frame 2 of the human-shaped adornment 7, a top ring 9 is added to the first arc 25 to provide a more steady base on the spiraled frame 2 for the separately made head.

Figure 5:
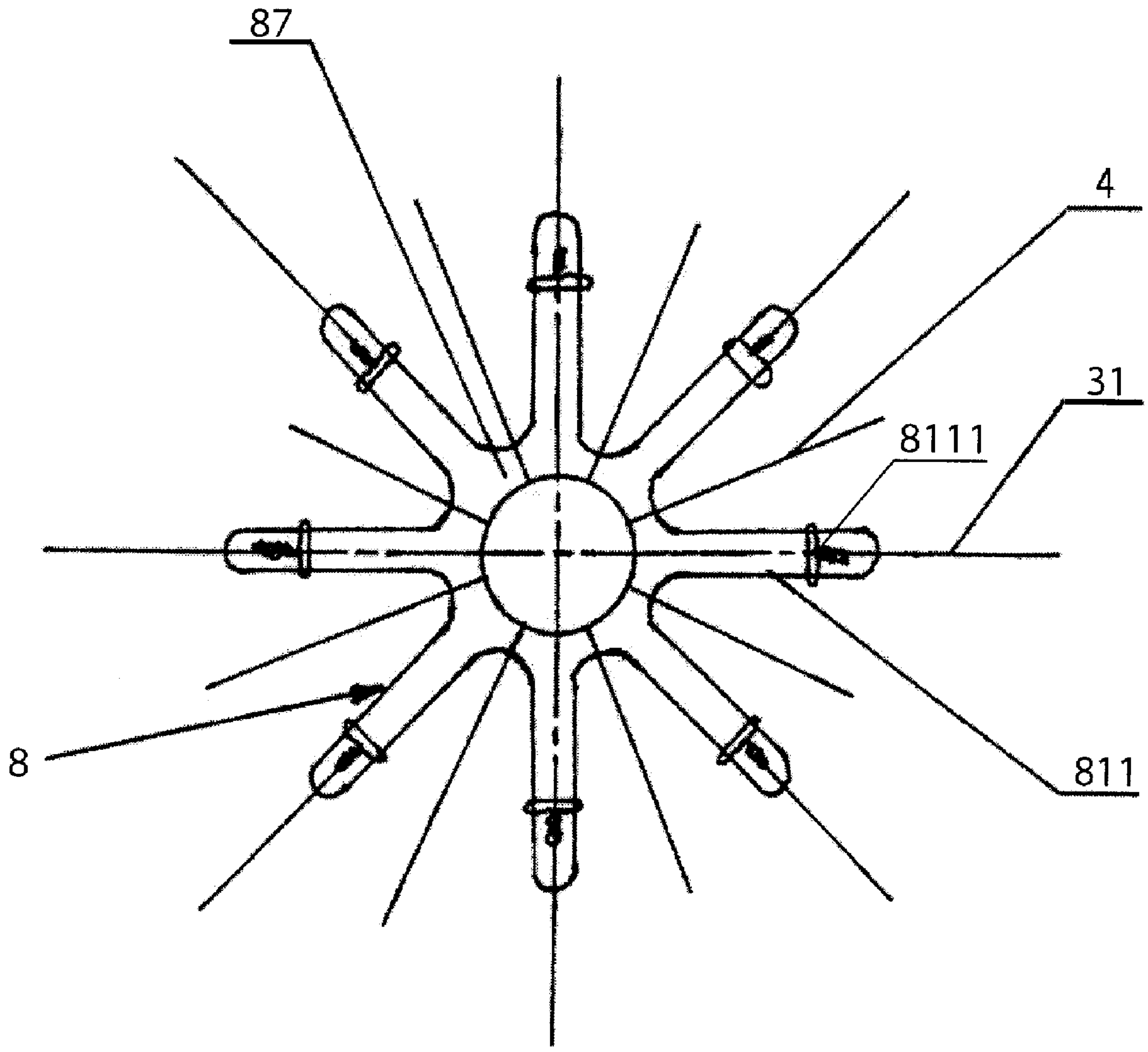
FIG. 5 is a structural sketch drawing of a connector of the human-shaped adornment of FIG. 2.

In addition, a top connector 8 of the second embodiment has another structure to accommodate the large top ring 9 of the spiraled frame 2. Referring to FIG. 5, the structure of the top connector 8 is familiar to that of the intermediate connector 5, comprising a cross-shaped component 87. The difference therebetween is an iron wire 31 instead of a peg to extend through the through hole 8111 of the slot-shaped extension 811 and be coupled to the top ring 9 of the spiral frame 2 after the iron wire 31 is enlaced through the through hole 8111. The connector 8 is connected with the connecting strings 4 as follows: each of the connecting strings 4 threads through the center hole of the cross-shaped component 87 and bonded therewith, and then connects with the rings of the spiraled frame 2.

Figure 7:
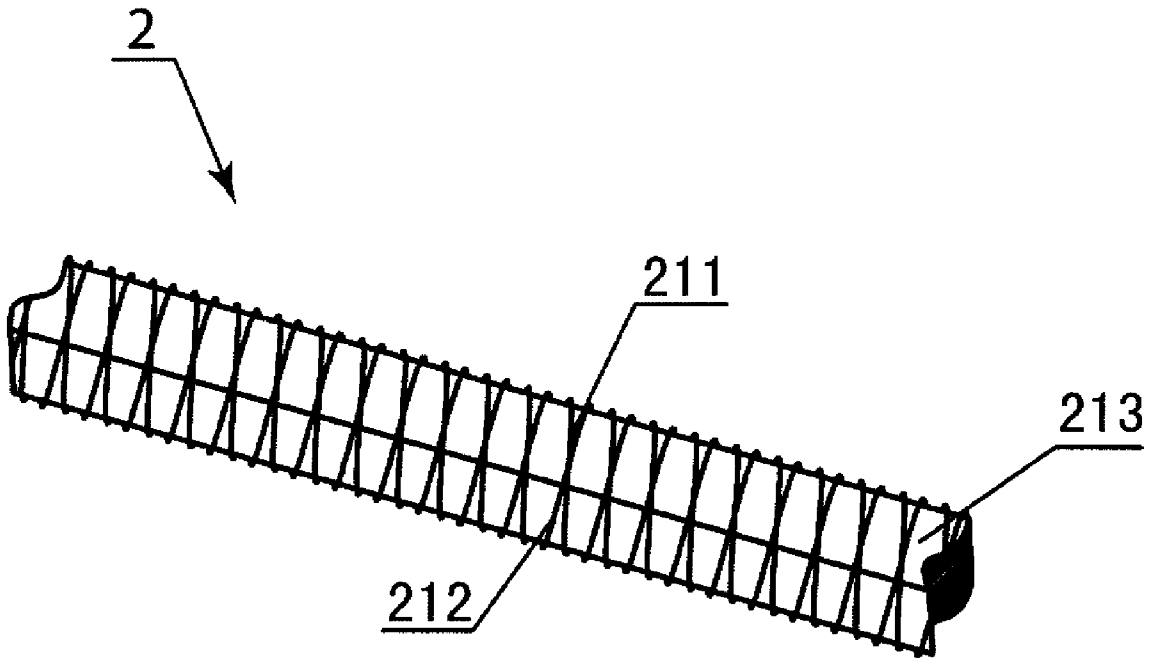
FIG. 7 depicts a PVC thin bar sandwiched between two metal silks.

FIG. 7 depicts an enlargement of an embodiment of a portion of the spiral frame 2 disclosed herein. The spiral frame comprises a PVC thin bar 213 that is sandwiched between two groups of metal silks 211 and 212. The two groups of metal silks 211 and 212 are twisted around the PVC thin bar 213.

Cluster lamps may be enlaced around the spiral frame 2 so as to give the human-shaped adornment a glistening appearance.

What is claimed is:

1. A human-shaped adornment comprising: a supporting holder, which comprising a base and a supporting component; and a spiraled frame having a same axis with the supporting component; wherein the spiraled frame comprising a plurality of rings, which outline along its axis direction is a curve which is constituted by three arcs smoothly connecting with each other in a predetermined sequence; wherein the center of the three arcs are on a same line and their diameters gradually increase from top to bottom; the spiraled frame connecting with the supporting component through a connector having a plurality of connecting strings connected therewith for keeping the space between every two rings of the spiraled frame; wherein the connecting strings sequentially connects with each ring of the spiraled frame from top to bottom, wherein the supporting component further comprising another several connectors in predetermined positions thereof, and each of the connectors is connected with the ring of the spiraled frame on a position corresponding to the position thereof, wherein each of the another several connectors comprising a pothook having a through hole in an end and a hook in the other end, and a cross-shaped component coupled to the supporting component; the cross-shaped component comprising a plurality of slot-shaped extensions extending radially; each of the slot-shaped extensions having a through hole formed therein; a peg extending through both the through holes in the slot-shaped extension and the pothook; the hook of the pothook coupled to the ring of the spiraled frame.

2. The human-shaped adornment according to the claim 1, wherein the spiraled frame is made from metal wire which is twisted by two groups of metal silks.

3. The human-shaped adornment according to the claim 2, wherein a PVC thin bar is sandwiched between the two groups of metal silks.

4. The human-shaped adornment according to the claim 1, wherein the spiraled frame is enlaced with cluster lamps.

* * * * *